W. T. LOWREY, Jr.
ANTISLIPPING ATTACHMENT FOR WHEELS.
APPLICATION FILED SEPT. 27, 1916.
1,250,908. Patented Dec. 18, 1917.
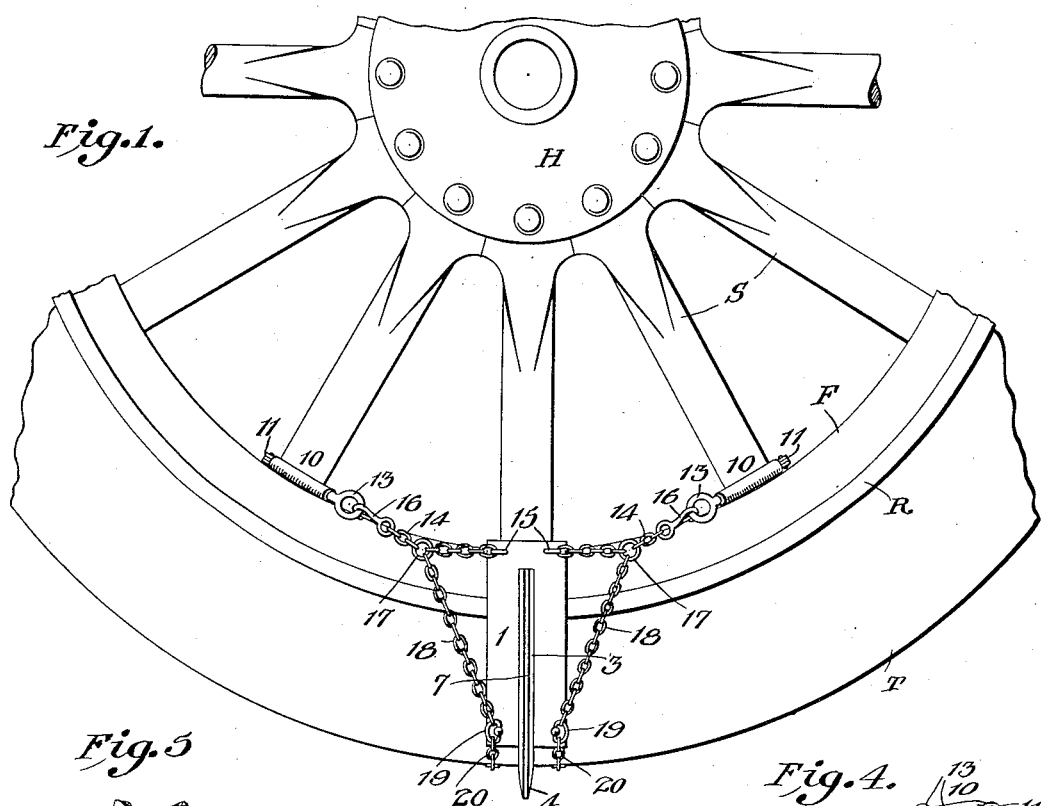
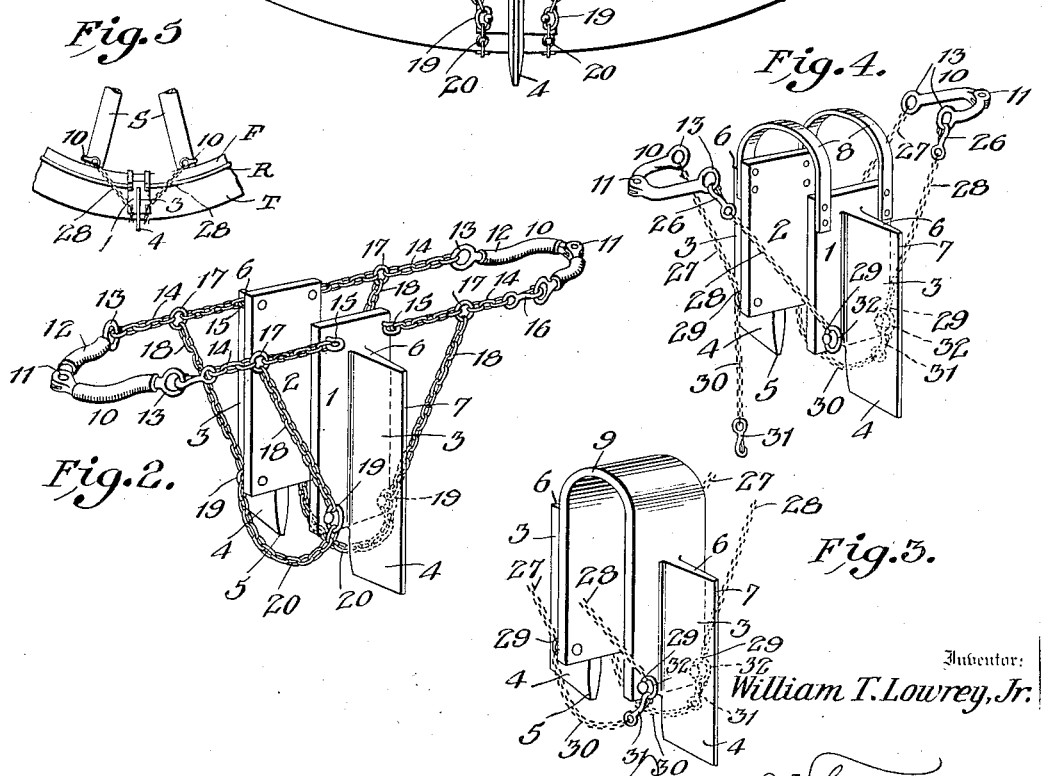
Inventor:
William T. Lowrey, Jr.
By Beall & Fenwick
Attorneys.

UNITED STATES PATENT OFFICE.

WILLIAM T. LOWREY, JR., OF BLUE MOUNTAIN, MISSISSIPPI.

ANTISLIPPING ATTACHMENT FOR WHEELS.

1,250,908.     Specification of Letters Patent.    Patented Dec. 18, 1917.

Application filed September 27, 1916. Serial No. 122,532.

*To all whom it may concern:*

Be it known that I, WILLIAM T. LOWREY, Jr., a citizen of the United States, residing at Blue Mountain, in the county of Tippah and State of Mississippi, have invented certain new and useful Improvements in Antislipping Attachments for Wheels; and I do hereby declare the following to be a full, clear, and exact description of the invention, such as will enable others skilled in the art to which it appertains to make and use the same.

This invention relates to wheels and tires, and more especially it is an anti-slipping attachment intended for application to the tire of an automobile wheel and useful on slippery roads, though perhaps finding its greatest utility when the car is mired and it is desired to start out of a mud hole into which the driving wheel has sunken. In the following specification I describe the preferred construction of this attachment, with one or two trifling modifications, reference being had to the accompanying drawings wherein:

Figure 1 is a side elevation of the lower portion of an automobile wheel with this attachment applied, and Fig. 2 is a perspective view of the attachment alone.

Fig. 3 is a perspective view of a slightly different type, Fig. 4 a similar view of a yet different type with one of the tread chains pendant, and Fig. 5 a detail showing a portion of the wheel in side elevation and with the last type of the attachment applied.

From the hub H spokes S radiate to the felly F which is here shown as surrounded by a rim R carrying a pneumatic tire T as usual with automobile wheels, but it will be clear that this attachment could be applied to a cushion tire or in fact to almost any form of tire where it was needed. I have not amplified the means for fitting the attachment to wheels of different sizes, but it is obvious that by removing or inserting links in the several chains, or by enlarging or reducing the arch in the types shown in Figs. 3 and 4, the attachment could be fitted to wheels whose spokes were differently spaced than as shown or whose wheel rim and tire were wider or narrower than illustrated.

Coming now to the details of my invention, the numerals 1 and 2 designate plates standing in parallelism and slightly spaced, and as seen in Fig. 1 these plates are intended to stand upright on opposite sides of the wheel rim, and are of a length sufficient to reach radially over its felly F, rim R, and nearly to the circle of the tread of its tire T when the latter is inflated or distended. The plates may be flat on their inner faces as seen in Fig. 2, or may be shaped to more closely fit the wheel rim, although if these plates are separate as seen in Fig. 2 the strain on the attachment will throw them against the sides of the wheel. Each plate has formed on it and projecting laterally outward a rather wide wing or fin 3, the same being disposed at about its transverse center and having its end 4 projecting beyond that of the plate and somewhat reduced in thickness as at 5, its other end 6 stopping short of the adjacent end of the plate, and its entire body preferably tapering to a rather narrow edge 7. Doubtless this fin will be formed integral with the plate at the time the same is made. In the modification shown in Fig. 4 the inner ends of the two plates are connected by an arch composed of two curved straps 8 riveted or otherwise secured at their ends to said plates, and in the modification shown in Fig. 3 this arch 9 is integral with the plates and is formed by curving one over into the other as seen. If it is here as thick and stiff as the plates they will not yield laterally very much if any, but if the arch is composed of straps 8 it is quite possible that they could be made resilient or pliable so that the device could be fitted to a wider wheel rim.

For fastening these plates to the wheel I provide two clevises 10, each preferably hinged at its center as at 11 and having its arms covered with cushions 12 as of rubber tubing or the like and provided with eyes 13 at their extremities, and these clevises are intended to pass around the spokes as seen in Fig. 1. When the plates are not connected with each other, chains 14 lead from the eyes 13 to points 15 at the inner corners of the plates to which they are permanently connected in any suitable way, and snap hooks or other similar devices 16 are employed at the ends of the chains on one side, engaging the eyes 13 of the two clevises as seen in Fig. 2. From points 17 in these several chains 14, other chains 18 extend to points 19 near the outer corners of the plates, where they are connected therewith, and from each point 19 on plate 1 a tread chain 20 passes around the tire T to the corresponding point 19 on the plate 2.

To apply this type of my attachment to a tire, the snaps 16 are detached from the eyes 13 at what will correspond with the outward side of the wheel, and the chain sections 14 between these snaps, as well as the two chains 18 and the outward plate 1 are allowed to hang by the two tread chains 20; then the other plate is passed to the inward side of the tire, the clevices 10 engaged around the spokes S, the plate 1 swung around the tire so that the tread chains pass across its wear face, and when the inner end of this plate is brought into proper position the snaps 16 can be engaged with the eyes 13 at the outward ends of the two clevices as will be clear. The attachment now stands on the wheel as seen in Fig. 1, and the lower ends 4 of the fins 3 depend below the lower ends of the plates and to a slight extent beyond the tread of the tire, the tread chains 20 preventing the plates and fins from moving radially inward, the main chains 14 holding the inner ends of the plates in proper position between the spokes, and the oblique chains 18 serving as braces.

In the type of my invention shown in Fig. 3 the plates are connected by an integral arch 9, and in Fig. 4 the same idea prevails except that the arch is made in two straps which may be resilient as above suggested. Mechanically these devices are the same, but they must be applied between spokes as seen in Fig. 5, because they cannot stand directly opposite a spoke as seen in Fig. 1. The support for either of these types of my invention employs the same clevices 10 but omits the main chains 14. Oblique chains 27 and 28 here lead from the eyes of the clevises to points 29 on the two plates, the inward chain 27 being permanently connected with the inner eyes while the outward chains 28 have snaps 26 detachably connected with the outward eyes. The tread chains 30 in this case lead from the points 29 across the wear face of the tire, and have snaps 31 on what will be the outward side of the attachment, and the outward plate 1 will carry eyes or rings 32 into which these snaps may be engaged. Similar rings are shown at the points 19 in Fig. 2, but they are employed therein only by preference.

To apply the attachment whose plates are connected by an arch, the snaps are disengaged from their eyes, the plates passed between two spokes and moved outward toward the felly, the clevises hooked around adjacent spokes, the oblique chains 28 engaged at 26 with the eyes 13, and the tread chains 30 brought across the wear face of the tire and their snaps 31 engaged with the rings 32.

It is quite obvious that a driving wheel can be equipped with enough of these attachments to render its tire anti-slipping by proper spacing of the attachment to engage the roadway, and slipping is prevented by the outward ends 5 of the fins as well as by the chains 20 or 30. But the primary function of this attachment is to enable the motorist to pull out of a mud hole into which one or both of his driving wheels may have sunken. In that case he need use but two of the attachments—one on either wheel. Assuming that he is quite deeply "mired" so that it is impossible to apply the attachment at the bottom of the wheel as seen in Fig. 1: he will of course apply it to what will then be the forward portion of each wheel and at a point sufficiently high from the surface of the road to enable him to put it into place with ease. After having secured an attachment to each wheel, he starts his motor and closes his clutch, and the first forward impulse of the driving wheels causes them to slip in the mud, brings the fins downward into it and gives him a large gripping surface so as to enable him to start out of the mud hole and pass onto a better portion of the road. The attachments travel around with the driving wheels, and he may leave them there or can stop and remove them if preferred. Thus it will be seen that two of these devices are sufficient for the primary purpose of the invention, and perhaps eight would be enough to convert smooth tread tires into anti-slipping tires, and all of them are of a size permitting them to be carried in an ordinary tool box.

What is claimed as new is:

1. The herein described anti-slipping attachment for wheels, the same comprising a pair of plates adapted to lie against opposite sides of the tire and radial to the wheel, a central traction fin carried by each plate and projecting outward therefrom in a plane at right angles to that of the plate, the fin extending lengthwise of the plate and beyond its radial outward extremity and projecting beyond the tire tread, and means for detachably connecting the plates with the wheel.

2. In an anti-slipping attachment for wheels, a pair of traction plates adapted to lie on opposite sides of the rim, clevises for engaging contiguous spokes and having eyes at their extremities, main chains connecting said eyes with the inner ends of the plates, and oblique chains connecting points in said main chains with the outer ends of the plates.

3. In an anti-slipping attachment for wheels, a pair of traction plates, clevises for engaging contiguous spokes, main side chains connected to the inner ends of said plates, snap hooks in the side chains to detachably engage said clevises, brace chains leading from the main chain to the outer ends of the plates, and cross element connecting the plates.

In testimony whereof I affix my signature in presence of two witnesses.

WILLIAM T. LOWREY, Jr.

Witnesses:
A. A. GRAHAM,
F. T. THOMPSON.